United States Patent
Johansson et al.

(10) Patent No.: US 7,815,707 B2
(45) Date of Patent: Oct. 19, 2010

(54) METAL POWDER COMPOSITION COMPRISING A DRYING OIL BINDER

(75) Inventors: Björn Johansson, Höganäs (SE); Hilmar Vidarsson, Munka-Ljungby (SE)

(73) Assignee: Höganäs AB, Höganäs (SE)

( * ) Notice: Subject to any disclaimer, the term of this patent is extended or adjusted under 35 U.S.C. 154(b) by 548 days.

(21) Appl. No.: 11/885,453

(22) PCT Filed: Jan. 27, 2006

(86) PCT No.: PCT/SE2006/000123
§ 371 (c)(1), (2), (4) Date: Aug. 31, 2007

(87) PCT Pub. No.: WO2006/096106
PCT Pub. Date: Sep. 14, 2006

(65) Prior Publication Data
US 2008/0134835 A1    Jun. 12, 2008

(30) Foreign Application Priority Data
Mar. 11, 2005  (SE) ................... 0500550

(51) Int. Cl.
*B22F 1/00* (2006.01)
(52) U.S. Cl. .................................. 75/252
(58) Field of Classification Search ............ 75/252
See application file for complete search history.

(56) References Cited

U.S. PATENT DOCUMENTS

| | | | | |
|---|---|---|---|---|
| 2,421,672 A | * | 6/1947 | Dodge et al. ........... | 106/14.17 |
| 2,739,902 A | * | 3/1956 | Mack et al. ........... | 106/264 |
| 3,565,781 A | * | 2/1971 | Jerabek ................ | 204/492 |
| 3,656,230 A | | 4/1972 | Hardung-Hardung | |
| 4,633,001 A | | 12/1986 | Cells | |
| 4,676,831 A | | 6/1987 | Engström | |
| 4,834,800 A | | 5/1989 | Semel | |
| 4,835,800 A | | 6/1989 | Johnson | |
| 5,429,792 A | | 7/1995 | Luk | |
| 6,068,813 A | | 5/2000 | Semel | |
| 6,682,579 B2 | | 1/2004 | Marasimhan et al. | |

FOREIGN PATENT DOCUMENTS

| | | |
|---|---|---|
| EP | 0 310 115 A1 | 9/1988 |
| EP | 0596627 A | 5/1994 |
| EP | 1 564 271 A1 | 3/2003 |
| GB | 1004171 A | 9/1965 |
| GB | 1324486 A | 7/1973 |

OTHER PUBLICATIONS

International Search Report, Jun. 14, 2006.
Written Opinion of the International Searching Authority, Jun. 14, 2006.

* cited by examiner

*Primary Examiner*—Roy King
*Assistant Examiner*—Ngoclan T Mai
(74) *Attorney, Agent, or Firm*—Buchanan Ingersoll & Rooney PC

(57) ABSTRACT

A powder metallurgical composition for making compacted parts is provided. Such composition comprises iron or an iron based powder, and a binder comprising a drying oil and a drying agent. In a preferred embodiment graphite also is present.

21 Claims, No Drawings

METAL POWDER COMPOSITION COMPRISING A DRYING OIL BINDER

TECHNICAL FIELD OF THE INVENTION

The present invention relates to a powder metallurgical composition for making compacted parts. Specifically the invention concerns a bonded iron powder composition comprising an improved binder.

BACKGROUND ART

In industry the use of metal products manufactured by compacting and sintering iron-based powder compositions is becoming increasingly widespread. The quality requirements of these metal products are continuously raised, and as a consequence new powder compositions having improved properties are developed. Some of the most important properties of the final, sintered products are the density and dimensional tolerances, which above all have to be consistent. Problems with size variations in the final product often originate from inhomogeneities in the powder mixture to be compacted. These problems are especially pronounced with powder mixtures including pulverulent components which differ in size, density and shape, a reason why segregation occurs during the transport, storage and handling of the powder composition. This segregation implies that the composition will be non-uniformly composed, which in turn means that parts made of the powder composition are differently composed and consequently have different properties. A further problem is that fine particles, particularly those of lower density, such as graphite, cause dusting in the handling of the powder mixture.

By adding a binder to the powder composition the segregation and dusting problems may be reduced or eliminated. The purpose of the binder is to firmly and effectively bind the small size particles of additives, such as alloying components, to the surface of the base metal particles and, consequently, reduce the problems of segregation and dusting.

One type of binding agents is based on tall oil, which is a drying oil consisting of tree resins and containing about 20-50% rosin acids (tall rosin) and about 35-55% free fatty acids. Such binding agents are disclosed in the U.S. Pat. Nos. 4,676,831, 4,834,800, 6,682,579 B2, 6,068,813 and 5,429,792.

U.S. Pat. No. 4,676,831 (Engström) generally discloses the use of certain tall oils as binding agents.

U.S. Pat. No. 4,834,800 (Semel) discloses the use of certain film forming and water insoluble alkyd resins which are the products of a polyhydric alcohol and a polybasic acid in the presence of a modifier, possibly a drying oil or a polymerisable liquid monomer such as e.g. linseed oil, soybean oil, tung oil or tall oil.

U.S. Pat. No. 6,682,579 B2 (Narasimhan) and U.S. Pat. No. 6,068,813 (Semel) disclose the possible use of tall oil esters as binders in metallurgical powder compositions.

U.S. Pat. No. 5,429,792 (Luk) discloses a metallurgical powder composition capable of being compacted at elevated temperatures and comprising an iron based powder, an alloying powder, a high temperature compaction lubricant and a binder. Preferred binding agents include cellulose ester resins, high molecular weight thermoplastic phenolic resins, hydroxyalkylcellulose resins, and mixtures thereof. The thermoplastic phenolic resin is the product of the esterification reaction between resin acids, from natural wood rosins and tall oil rosins, and a compound containing an alcohol moiety such as e.g. methanol, methylene and diethylene glycol, glycerol and pentaerythritol.

Although binding agents based on drying oils often perform satisfactorily, problems can occur during large scale production and these problems can lead to unacceptable product inhomogenities and too broad weight scatter range of the compacted parts. After extensive studies it has now been found that these problems arise when the drying times of the oil vary and cannot be adequately controlled. The present invention concerns a solution of this problem.

SUMMARY OF THE INVENTION

An object of the present invention is thus to provide a new powder metallurgical composition for making compacted parts with low weight scatter ranges. This new composition is well suited for large scale production of the compacted parts and it is distinguished by a minimum of segregation during transport, storage and handling, by a low level of dusting and by adequate flow characteristics.

This object is achieved by using a drying oil in combination with a drying agent as a binder. Thus the present invention concerns powder metallurgical compositions for making compacted parts, which compositions comprise an iron or iron based powder, graphite and optionally other alloying elements, lubricants or additives, and a binder comprising a drying oil and a drying agent.

DETAILED DESCRIPTION OF THE INVENTION

The drying agents of the present invention are compounds facilitating the controlled drying of a drying oil, making it possible to adjust the drying time of the oil in conformity with the current process requirements. The drying agents should be soluble in the drying oil, and these agents may chemically be described as metallic soaps, containing either alkaline earth metals or heavy metals. The drying agents are preferably chosen from Zn, Co, Mn, Pb, Zr, or Ca salts of octanoic or naphthenic acids, whereof cobalt naphthenate is most preferred.

Depending on the type of drying agent used, the optimal rate of addition to the drying oil can easily be established through experiments.

In this context a drying oil may chemically be described as an ester of a polyunsaturated fatty acid and a polyol, which polymerises (cures) through a reaction with oxygen, forming solid films capable of binding finer particles to the iron based powder particles. In a preferred drying oil the polyunsaturated fatty acids derive from tall oil fatty acids or linseed oil fatty acids and the polyol is preferably chosen from the group of glycerol, propan-1,3-diol, penta-, dipenta- or tripentaerythritol.

The binder is added to the iron based powder composition in amounts of 0.01-1 wt %, preferably 0.01-0.5 wt %. The amount of the drying agent in the binder is 0.01-5 wt % depending on the type of drying oil and drying agent used and the preferred drying time. According to a presently preferred embodiment of the invention the drying agent is used in an amount between 0.05 and 2.5, more preferably between 0.1 and 1 w % of the binder.

The purpose of the binder is, as stated above, to firmly and effectively bind the small size particles of graphite, other alloying elements and other additives to the surface of the base metal particles and, consequently, reduce the problems of segregation and dusting. It has now surprisingly been found that by close control of the drying time of a binder comprising a drying oil, not only an acceptable level of dusting and flow rate can be achieved, but also a substantial narrowing of the weight scatter range of components produced on an industrial scale.

The drying time of the binder is preferably controlled to a value of less than 4 hours by the addition of at least one drying agent to the drying oil. Furthermore, in order to facilitate the production of homogenous bonded powder mixtures on an industrial scale before the binder has dried completely, it is preferred that the drying time should not be shorter than about 30 minutes. However, other preferred intervals of the drying time may be of interest depending on the amount, type and size of the material to be bound, and/or on other parameters. The preferred interval of the drying time can easily be established by experiment. The above drying time values refer to measurements at ambient temperature and humidity with the aid of a Rhopoint Thin Film Analyser (TFA).

The characteristics of the other components of the metallurgical powder composition of the present invention are now briefly discussed.

The iron or iron-based powder may be an essentially pure iron powder or a mixture of different iron-powders which is admixed with the pulverulent additives. The powder may also be a pre-alloyed powder or a diffusion or partially alloyed powder. The particle size of the iron or iron-based particles preferably have a maximum weight average particle size up to about 500 μm.

Examples of alloying elements are copper, molybdenum, chromium, nickel, manganese, phosphorus, carbon in the form up graphite and tungsten, which are either used separately or in combination. The commonly used elements copper and nickel may suitably be used in amounts up to 3 wt % and 5 wt %, respectively. The amount of graphite may vary between 0.1 and 2 wt %. These additives are generally powders having a smaller particle size than the base iron powder, and most additives have a particle size of less than about 20 μm.

Furthermore, the compositions according to the pre-sent invention may include common additives such as sintering aids, hard phase materials, machinability improving agents.

Examples of lubricants are metal stearates e.g. zinc stearate, and amide waxes e.g. ethylene bisstearamide. The lubricant may be included in the metallurgical composition in amounts up to 1.5 wt %.

The invention is further illustrated by the following non-limiting examples concerning a preferred embodiment of the present invention.

EXAMPLE 1

This example concerns the relationship between the drying times and the added amounts of drying agent.

As binder a drying oil comprising tall oil esters, obtained through the esterification of tall oil fatty acids and dipentaerythritol, and a drying agent were used. As drying agent a 10 wt % solution of cobalt naphthenate was used.

In order to control the drying time of the drying oil, different amounts of the drying agent were mixed with the drying oil. The relationship between the added amount of drying agent, as percent by weight of the drying oil, and the drying time, measured at ambient temperature and humidity with the aid of a Rhopoint Thin Film Analyser (TFA), is shown in Table 1 below.

TABLE 1

| Amount of Drying Agent (%) | Drying Time (hours) |
|---|---|
| 0.20 | 6.5 |
| 0.25 | 4.8 |
| 0.30 | 4.0 |
| 0.40 | 2.3 |
| 0.50 | 1.7 |
| 0.60 | 0.5 |

As can be seen the amounts of the drying agent cobolt naphthenate in tall oil ester should vary between 0.3 and 0.6 wt % in order to obtain suitable drying times.

EXAMPLE 2

This example demonstrates the effect of the amount of drying agent in the binder on weight scatter of the produced compacted parts.

The same drying oil and drying agent as in example 1 were used.

Two iron powder mixtures A and B, respectively, were prepared. Both mixtures contained the atomised iron powder AHC 100.29 available from Höganäs AB, 2 wt % of a copper powder, 0.8 wt % of graphite UF-4, and 0.8 wt % of zinc stearate as lubricant. To the first mixture, 0.05 wt % of the binder comprising 0.25 wt % drying agent and balance drying oil was added, and to the second mixture, 0.05 wt % of the binder comprising 0.5 wt % drying agent and balance drying oil was added.

From each of the mixtures, 200 pieces of a component, having a target weight of 250 g, were produced in an industrial environment. Every piece was weighed, and pieces having a weight deviation of more than ±1.25 g were rejected. Table 2 shows the number of rejected pieces, when produced in an industrial environment, from each of the different compositions.

TABLE 2

| Mixture | Amount of drying agent (wt %) | No. of Rejected Pieces |
|---|---|---|
| A | 0.25 | 20 |
| B | 0.5 | 0 |

As can be seen from Table 2 the addition of a drying agent in an amount sufficient to control the drying time to between 30 minutes and 4 hours clearly reduces the number of rejected pieces when producing a component in an industrial environment.

The invention claimed is:

1. A powder metallurgical composition for making compacted parts, comprising an iron or iron-based powder and a binder consisting of a drying oil in combination with a drying agent wherein the drying oil comprises an ester obtained through the esterification of a polyunsaturated fatty acid and a polyol and the amount of binder is between 0.01-1 wt % of the composition and the amount of drying agent in the binder is 0.01-5 wt %.

2. A powder metallurgical composition according to claim 1, wherein the polyunsaturated fatty acid is derived from tall oil or from linseed oil.

3. A powder metallurgical composition according to claim 1, wherein the polyol is selected from the group consisting of glycerol, propan-1,3-diol and dipenta- or tripentaerythritol.

4. A powder metallurgical composition according to claim 1, wherein at least one component of the drying agent is selected from the group consisting of oil soluble Zn, Co, Mn, Pb, Zr, or Ca salts of octanoic or naphthenic acids.

5. A powder metallurgical composition according to claim 4, wherein the drying agent is cobalt naphthenate.

6. A powder metallurgical composition according to claim 1, wherein the amount of binder is between 0.01-0.5 wt %.

7. A powder metallurgical composition according to claim 1, wherein the binder has a drying time of 0.5-4 hours.

8. A powder metallurgical composition according to claim 1, further comprising graphite.

9. A powder metallurgical composition according to claim 1, further comprising at least one lubricant.

10. A powder metallurgical composition according to claim 1, further comprising at least one additive selected from the group consisting of alloying elements, sintering aids, machinability improving agents and hard phase materials.

11. A powder metallurgical composition according to claim 6, wherein at least one component of the drying agent is selected from the group consisting of oil soluble Zn, Co, Mn, Pb, Zr, or Ca salts of octanoic or naphthenic acids.

12. A powder metallurgical composition according to claim 2, wherein at least one component of the drying agent is selected from the group consisting of oil soluble Zn, Co, Mn, Pb, Zr, or Ca salts of octanoic or naphthenic acids.

13. A powder metallurgical composition according to claim 3, wherein at least one component of the drying agent is selected from the group consisting of oil soluble Zn, Co, Mn, Pb, Zr, or Ca salts of octanoic or naphthenic acids.

14. A powder metallurgical composition according to claim 6, wherein the polyunsaturated fatty acid is derived from tall oil or from linseed oil.

15. A powder metallurgical composition according to claim 6, wherein the polyol is selected from the group consisting of glycerol, propan-1,3-diol and dipenta- or tripentaerythritol.

16. A powder metallurgical composition according to claim 6, wherein at least one component of the drying agent is selected from the group consisting of oil soluble Zn, Co, Mn, Pb, Zr, or Ca salts of octanoic or naphthenic acids.

17. A powder metallurgical composition according to claim 6, wherein the drying agent is cobalt naphthenate.

18. A powder metallurgical composition according to claim 6, wherein the binder has a drying time of 0.5-4 hours.

19. A powder metallurgical composition according to claim 6, further comprising graphite.

20. A powder metallurgical composition according to claim 6, further comprising at least one lubricant.

21. A powder metallurgical composition according to claim 6, further comprising at least one additive selected from the group consisting of alloying elements, sintering aids, machinability improving agents and hard phase materials.

* * * * *